(12) United States Patent
Ziche

(10) Patent No.: US 7,795,367 B2
(45) Date of Patent: Sep. 14, 2010

(54) METHOD FOR PRODUCING SILOXANE COPOLYMERS

(75) Inventor: Wolfgang Ziche, Burghausen (DE)

(73) Assignee: Wacker Chemie AG, Munich (DE)

( * ) Notice: Subject to any disclaimer, the term of this patent is extended or adjusted under 35 U.S.C. 154(b) by 853 days.

(21) Appl. No.: 11/568,132

(22) PCT Filed: Apr. 21, 2005

(86) PCT No.: PCT/EP2005/004300

§ 371 (c)(1), (2), (4) Date: Oct. 20, 2006

(87) PCT Pub. No.: WO2005/105895

PCT Pub. Date: Nov. 10, 2005

(65) Prior Publication Data

US 2009/0156774 A1    Jun. 18, 2009

(30) Foreign Application Priority Data

Apr. 27, 2004   (DE) .................. 10 2004 020 563

(51) Int. Cl.
   *C08G 77/04*   (2006.01)
(52) U.S. Cl. ..................... 528/28; 528/903
(58) Field of Classification Search .......... 528/28
   See application file for complete search history.

(56) References Cited

U.S. PATENT DOCUMENTS

| | | | | |
|---|---|---|---|---|
| 3,632,557 A * | 1/1972 | Brode et al. | .................. | 528/28 |
| 4,474,933 A * | 10/1984 | Huber et al. | .................. | 528/26 |
| 6,265,598 B1 | 7/2001 | Kimura et al. | | |
| 6,288,198 B1 * | 9/2001 | Mechtel et al. | ............... | 528/28 |
| 6,762,270 B2 * | 7/2004 | Ludewig et al. | .............. | 528/28 |
| 7,060,760 B2 * | 6/2006 | Schindler et al. | ............ | 525/474 |
| 2004/0254325 A1 | 12/2004 | Kuepfer et al. | | |
| 2005/0234208 A1 * | 10/2005 | Koch et al. | .................... | 528/34 |
| 2006/0270807 A1 * | 11/2006 | Zhu et al. | .................... | 525/453 |

FOREIGN PATENT DOCUMENTS

| | | |
|---|---|---|
| EP | 0 137 883 | 4/1985 |
| EP | 1 006 146 A1 | 6/2000 |
| EP | 1 489 129 A1 | 12/2004 |
| WO | WO 95/21206 | 8/1995 |
| WO | WO 02/077072 A1 | 10/2002 |

OTHER PUBLICATIONS

US 2004/0254325 A1 is corresponding to EP 1 489 129 A1.
Patbase Abstract corresponding to EP 1 006 146 A1.

* cited by examiner

*Primary Examiner*—Randy Gulakowski
*Assistant Examiner*—Lindsay Nelson
(74) *Attorney, Agent, or Firm*—Brooks Kushman P.C.

(57) ABSTRACT

Siloxane copolymers are prepared stepwise by reacting an aminoalkyldiorganoalkoxysilane with a di- or polyisocyanate to form an alkoxysilyl-terminated urea compound, and the urea compound or its reaction product with water is subsequently reacted with a di- or polysilanol-functional polymer to form a copolymer.

11 Claims, No Drawings

METHOD FOR PRODUCING SILOXANE COPOLYMERS

CROSS-REFERENCE TO RELATED APPLICATION

This application is the U.S. national phase of PCT Appln. No. PCT/EP2005/004300 filed Apr. 21, 2005, which claims priority to German application 10 2004 020 563.9 filed Apr. 27, 2004.

BACKGROUND OF THE INVENTION

1. Field of the Invention

The invention relates to a process for preparing siloxane copolymers.

2. Description of the Related Art

The preparation of siloxane copolymers and block copolymers is already known. The reaction of alkoxysilanes with silanol-terminated siloxanes to form alkoxysilyl-terminated siloxanes which are frequently used in crosslinkable compositions is likewise known, as described, for example, in U.S. Pat. No. 6,265,598 and EP-A 137 883. The fact that monoalkoxysilyl groups are not reactive in crosslinking reactions is exploited, for example, to achieve a desired degree of undercrosslinking. On the subject, reference may be made, for example, to EP-A 1 006 146.

SUMMARY OF THE INVENTION

Siloxane copolymers are prepared stepwise by reacting an aminoalkyldiorganoalkoxysilane with a di- or polyisocyanate to form an alkoxysilyl-terminated urea compound, and the urea compound or its reaction product with water is subsequently reacted with a di- or polysilanol-functional polymer to form a copolymer.

DETAILED DESCRIPTION OF THE PREFERRED EMBODIMENT(S)

The invention provides a process for preparing siloxane copolymers, wherein in a first step an organyloxysilane of the formula $$R^7—SiR^1{}_2—R^6—NHR^2 \quad (I)$$

is reacted with an isocyanate of the formula $$R^3(NCO)_x \quad (II)$$

to form a urea compound of the formula $$R^3(NH—(C=O)—NR^2—R^6—SiR^1{}_2OR^7)_x \quad (III)$$

where the radicals $R^1$ can be identical or different and are each a monovalent, substituted or unsubstituted hydrocarbon radical which may be interrupted by heteroatoms, $R^2$ is a hydrogen atom or a monovalent, substituted or unsubstituted hydrocarbon radical which may be interrupted by heteroatoms, $R^3$ is a polyvalent, substituted or unsubstituted hydrocarbon radical which may be interrupted by heteroatoms, $R^6$ is a divalent hydrocarbon radical which may be interrupted by heteroatoms, $R^7$ is a monovalent, substituted or unsubstituted hydrocarbon radical which may be interrupted by heteroatoms, x is an integer greater than 1, preferably 2 or 3, more preferably 2, if desired in a second step the urea compound of the formula (III) is reacted with water and in a third step the urea compound of the formula (III) and/or its reaction product obtained from the second step is reacted with a silanol-terminated compound of the formula $$R^5(SiR^4{}_2—OH)_y \quad (IV)$$

to form a copolymer, where the radicals $R^4$ can be identical or different and each have one of the meanings given for $R^1$, $R^5$ is a polyvalent polyether radical, polyester radical or polysiloxane radical and y is an integer greater than 1, preferably 2 or 3, most preferably 2.

Examples of radicals $R^1$ are alkyl radicals such as the methyl, ethyl, n-propyl, isopropyl, 1-n-butyl, 2-n-butyl, isobutyl, tert-butyl, n-pentyl, isopentyl, neopentyl, tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical and octadecyl radicals such as the n-octadecyl radical; cycloalkyl radicals, such as cyclopentyl, cyclohexyl, cycloheptyl and methylcyclohexyl radicals; alkenyl radicals such as the vinyl, 5-hexenyl, cyclohexenyl, 1-propenyl, allyl, 3-butenyl and 4-pentenyl radicals; alkynyl radicals such as the ethynyl, propargyl and 1-propynyl radicals; aryl radicals such as the phenyl, naphthyl, anthryl and phenanthryl radicals; alkaryl radicals such as o-, m-, p-tolyl radicals, xylyl radicals and ethylphenyl radicals; and aralkyl radicals such as the benzyl radical, the α-phenylethyl radical and the β-phenylethyl radical.

Examples of substituted radicals $R^1$ are haloalkyl radicals such as the 3,3,3-trifluoro-n-propyl radical, the 2,2,2,2',2',2'-hexafluoroisopropyl radical, the heptafluoroisopropyl radical, and haloaryl radicals such as the o-, m- and p-chlorophenyl radicals, and also all radicals mentioned above for $R^1$ which may be substituted, preferably by mercapto groups, epoxy-functional groups, carboxyl groups, keto groups, enamine groups, amino groups, aminoethylamino groups, aryloxy groups, acryloxy groups, methacryloxy groups, hydroxy groups and halogen groups.

Radicals $R^1$ are preferably unsubstituted or fluorine- or chlorine-substituted hydrocarbon radicals having from 1 to 12 carbon atoms, most preferably hydrocarbon radicals having from 1 to 3 carbon atoms, in particular the methyl radical.

Examples of radicals $R^2$ are the examples given above for radicals $R^1$. Radical $R^2$ is preferably a hydrogen atom or a hydrocarbon radical which has from 1 to 12 carbon atoms and may be substituted by amino groups, more preferably a hydrogen atom or a hydrocarbon radical having from 1 to 6 carbon atoms, in particular a hydrogen atom.

Examples of radicals $R^3$ are the hexylene radical, the 4,4'-methylenedicyclohexylene radical, the 4,4'-methylenediphenylene radical, the 1,3-diazetidiene-2,4-dione-bis(4,4'-methylenedicyclohexyl)ene radical, the isocya-nuratetris(4,4'-methylenedicylcohexyl)ene radical, the 1,3-diazetidine-2,4-dionebis(4,4'-methylenediphenyl)-ene radical, the isocyanuratetris(4,4'-methylenediphenyl)ene radical and the isophoronylene radical.

The radical $R^3$ is preferably a divalent or trivalent hydrocarbon radical which has from 1 to 24 carbon atoms and may be interrupted by heteroatoms, particularly preferably the divalent hexylene radical, the 4,4'-methylenedicyclohexylene radical, the 4,4'-methyl-enediphenylene radical and the isophoronylene radical, in particular the 4,4'-methylenedicyclohexylene radical and the isophoronylene radical.

Examples of divalent radicals $R^6$ are alkylene radicals such as the methylene, ethylene, n-propylene, isopropylene, n-butylene, isobutylene, tert-butylene, n-pentylene, isopentylene, neopentylene, tert-pentylene radicals, hexylene radicals such as the n-hexylene radical, heptylene radicals such as the n-heptylene radical, octylene radicals such as the n-octylene radical and isooctylene radicals such as the 2,2,4-trimethylpentylene radical, nonylene radicals such as the n-nonylene radical, decylene radicals such as the n-decylene radical, dodecylene radicals such as the n-dodecylene radical; alkenylene radicals such as the vinylene radical and the allylene radical; cycloalkylene radicals such as cyclopentylene, cyclohexylene, cycloheptylene radicals and methylcyclohexylene radicals; arylene radicals such as the phenylene radical and the naphthylene radical; alkarylene radicals such as o-, m-, p-tolylene radicals, xylylene radicals and ethylphenylene radicals; aralkylene radicals such as the benzylene radical, the α-phenylethylene radical and the β-phenylethylene radical.

Radicals $R^6$ are preferably divalent hydrocarbon radicals having from 1 to 12 carbon atoms, particularly preferably divalent hydrocarbon radicals having from 1 to 3 carbon atoms, in particular the methylene radical and the propylene radical, most preferably the methylene radical.

Examples of radicals $R^7$ are the examples given for radical $R^1$ and also radicals R—C(=O)— where R is a monovalent hydrocarbon radical, e.g. $H_3C$—C(=O)—, and radicals $R^a R^b C=N$—O where $R^a$ is a monovalent hydrocarbon radical and $R^b$ is a monovalent hydrocarbon radical, e.g. $(H_3C$—$CH_2)(H_3C)C=N$—.

Examples of R, $R^a$ and $R^b$ are, independently of one another, the hydrocarbon radicals indicated for radical $R^1$, with the methyl radical and the ethyl radical being particularly preferred.

Radicals $R^7$ are preferably unsubstituted or alkoxy-substituted hydrocarbon radicals having from 1 to 12 carbon atoms, most preferably hydrocarbon radicals having from 1 to 3 carbon atoms, in particular the methyl radical.

Examples and preferred ranges for radical $R^4$ are the examples of preferred ranges given for radical $R^1$.

Examples of polyvalent radicals $R^5$ are divalent, trivalent and tetravalent polypropylene glycol radicals, polyethylene glycol radicals, polysiloxane radicals, polybutadiene radicals, polyisoprene radicals, polyurea radicals and polyurethane radicals. Radicals $R^5$ are preferably divalent polyether or polysiloxane radicals, particularly preferably divalent polysiloxane radicals.

Examples of silanes of the formula (I) used according to the invention are $H_3C$—O—$CH_2$—$CH_2$—O—Si $(CH_3)_2$—$(CH_2)_3$—$NH_2$, $H_3C$—O—$CH_2$—$CH_2$—O—Si $(CH_3)_2$—$(CH_2)$—$NH_2$, $H_3C$—O—$CH_2$—$CH_2$—O—Si $(CH_3)_2$—$(CH_2)_3$—$NH(C_6H_{11})$, $H_3C$—O—$CH_2$—$CH_2$—O—Si $(CH_3)_2$—$(CH_2)$—$NH(C_6H_{11})$, $H_3C$—O—Si $(CH_3)_2$—$(CH_2)$—$NH_2$, $H_3C$—O—Si $(CH_3)_2$—$(CH_2)_3$—$NH(C_6H_{11})$, $H_3C$—O—Si $(CH_3)_2$—$(CH_2)$—$NH(C_6H_{11})$, $H_3C$—C=O—O—$CH_2$—$CH_2$—O—Si$(CH_3)_2$—$(CH_2)_3$—$NH_2$, $H_3C$—C=O—O—$CH_2$—$CH_2$—O—Si $(CH_3)_2$—$(CH_2)$—$NH_2$, $H_3C$—C=O—O—$CH_2$—$CH_2$—O—Si $(CH_3)_2$—$(CH_2)_3$—$NH(C_6H_{11})$, $H_3C$—C=O—O—$CH_2$—$CH_2$—O—Si $(CH_3)_2$—$(CH_2)$—$NH(C_6H_{11})$, $(H_3C)(H_3C$—$CH_2)$—C=N—O—Si $(CH_3)_2$—$(CH_2)_3$—$NH_2$, $(H_3C)(H_3C$—$CH_2)$—C=N—O—Si $(CH_3)_2$—$(CH_2)$—$NH_2$, $(H_3C)(H_3C$—$CH_2)$—C=N—O—Si$(CH_3)_2$—$(CH_2)_3$—$NH(C_6H_{11})$ and $(H_3C)(H_3C$—$CH_2)$—C=N—O—Si $(CH_3)_2$—$(CH_2)$—$NH(C_6H_{11})$, with $H_3C$—O—Si $(CH_3)_2$—$(CH_2)_3$—$NH_2$, $H_3C$—O—Si $(CH_3)_2$—$(CH_2)$—$NH_2$, $H_3C$—O—Si $(CH_3)_2$—$(CH_2)_3$—$NH(C_6H_{11})$ and $H_3C$—O—Si $(CH_3)_2$—$(CH_2)$—$NH(C_6H_{11})$ being preferred and $CH_3$—O—Si $(CH_3)_2$—$(CH_2)$—$NH_2$ and $H_3C$—O—Si $(CH_3)_2$—$(CH_2)$—$NH(C_6H_{11})$ being particularly preferred.

Examples of isocyanates of the formula (II) used according to the invention are hexylene diisocyanate, methylene-dicyclohexylene 4,4'-diisocyanate, methylenediphenylene 4,4'-diisocyanate, 1,3-diazetidine-2,4-dionebis(4,4'-methylenedicyclohexyl)diisocyanate, isocyanuratetris(4,4'-methylenedicyclohexyl)triisocyanate, 1,3-diazetidine-2,4-dionebis(4,4'-methylenediphenyl)diisocyanate, isocyanuratetris(4,4'-methylenediphenyl)triisocyanate and isophorone diisocyanate, with hexylene diisocyanate, methylenedicyclohexylene 4,4'-diisocyanate, methylene-diphenylene 4,4'-diisocyanate and isophorone diisocyanate being preferred and hexylene diisocyanate, methylene-dicyclohexylene 4,4'-diisocyanate and isophorone di-isocyanate being particularly preferred.

In the first step of the process of the invention, isocyanate of the formula (II) is used in amounts of preferably from 0.9 to 1.1 molar equivalents of isocyanate groups to amine groups of the silane of the formula (I), more preferably from 0.98 to 1.02 equivalents.

In the first step of the process of the invention, the isocyanate of the formula (II) is mixed with silane of the formula (I) in any manner and allowed to react. If desired, a polar organic solvent can be used, but this is not preferred. Examples of polar solvents which may be used are dimethylformamide, isopropanol, tetrahydrofuran, dioxane and dimethylsulfoxide.

The reaction in the first step is preferably carried out at a temperature of from 0 to 80° C., more preferably from 40 to 70° C., and at the pressure of the surrounding atmosphere, i.e. in the range from 900 to 1100 hPa, and preferably with exclusion of moisture.

In the optional second step of the process, the urea compound of the formula (III) obtained in the first step is reacted with water, preferably in a stoichiometric ratio to the amount of the hydrolyzable groups or in excess, resulting in liberation of compound $R^7OH$, where $R^7$ is as defined above. If desired, the compound $R^7OH$ formed can be removed from the reaction mixture by distillation, preferably under reduced pressure. The reaction mixture of the first step may be mixed with water in any manner and allowed to react. Solvent used in the first process step does not have to be removed beforehand.

The hydrolysis of the second step can be carried out with the aid of acidic or basic catalysts known to those skilled in the art, e.g. formic acid or ammonium hydroxide. Preference is given to carrying out the hydrolysis without using any catalyst, and at a temperature of from 0 to 80° C., more preferably from 40 to 70° C., and at the pressure of the surrounding atmosphere, i.e. in the range from 900 to 100 hPa.

Examples of compounds of the formula (IV) are

[(O—CH$_2$—CH(CH$_3$)O)$_n$]((CH$_2$)$_3$Si(CH$_3$)$_2$—OH)$_2$ having a number average M$_n$ of from about 500 to 30,000,

[(O—CH$_2$—CH$_2$O)$_n$]((CH$_2$)$_3$Si(CH$_3$)$_2$—OH)$_2$ having a number average M$_n$ of from about 500 to 30,000,

[(O—CH$_2$—CH(CH$_3$)O)$_n$]((CH$_2$)Si(CH$_3$)$_2$—OH)$_2$ having a number average M$_n$ of from about 500 to 30,000,

[(O—CH$_2$—CH$_2$O)$_n$]((CH$_2$)Si(CH$_3$)$_2$—OH)$_2$ having a number average M$_n$ of from about 500 to 30,000,

[O—CH$_2$—CH(CH$_3$) O—C=O—NH—(C$_6$H$_{10}$—C(CH$_3$)$_2$—C$_6$H$_{10}$)$_n$—NH—C=O—]$_n$ ((CH$_2$)$_3$—Si(CH$_3$)$_2$—OH)$_2$ having a number average M$_n$ of from about 1000 to 300,000,

[O—CH$_2$—CH$_2$O—C=O—NH— (C$_6$H$_{10}$—C(CH$_3$)$_2$—C$_6$H$_{10}$)$_n$—NH—C=O—]$_n$—((CH$_2$)$_3$Si(CH$_3$)$_2$—OH)$_2$ having a number average M$_n$ of from about 1000 to 300,000,

[O—CH$_2$—CH(CH$_3$)O—C=O—NH—(C$_6$H$_{10}$—C(CH$_3$)$_2$—C$_6$H$_{10}$)$_n$—NH—C=O—]$_n$—((CH$_2$)Si(CH$_3$)$_2$—OH)$_2$ having a number average M$_n$ of from about 1000 to 300,000,

[O—CH$_2$—CH$_2$O—C=O—NH—(C$_6$H$_{10}$—C(CH$_3$)$_2$—C$_6$H$_{10}$)$_n$—NH—C=O—]$_n$((CH$_2$)Si(CH$_3$)$_2$—OH)$_2$ having a number average M$_n$ of from about 1000 to 300,000, HO[Si(CH$_3$)$_2$—O]$_n$H having a viscosity of from 10 to 2,000,000 mPas at 25° C., HO[Si(CH$_3$)$_2$—O]$_n$[Si(CH$_3$)(CH=CH$_2$)—O]$_o$H having a viscosity of from 10 to 2,000,000 mPas at 25° C.,

[(CH$_2$—CH=CH—CH$_2$)$_n$]((CH$_2$)$_3$Si(CH$_3$)$_2$—OH)$_2$ having a number average M$_n$ of from about 500 to 8000 and

[(CH$_2$—CH=CH—CH$_2$)$_n$]((CH$_2$)$_3$Si(CH$_3$)$_2$—OH)$_2$ having a number average M$_n$ of from about 500 to 8000, with HO[Si(CH$_3$)$_2$O]$_n$H having a viscosity of from 10 to 2,000,000 mPas at 25° C., HO[Si(CH$_3$)$_2$O]$_n$[Si(CH$_3$)(CH=CH$_2$)—O]$_o$H having a viscosity of from 10 to 2,000,000 mPas at 25° C.,

[(O—CH$_2$—CH(CH$_3$)O)$_n$]((CH$_2$)$_3$Si(CH$_3$)$_2$—OH)$_2$ having a number average M$_n$ of from about 500 to 30,000,

[(O—CH$_2$—CH$_2$O)$_n$]((CH$_2$)$_3$Si(CH$_3$)$_2$—OH)$_2$ having a number average M$_n$ of from about 500 to 30,000,

[(O—CH$_2$—CH(CH$_3$)O)$_n$]((CH$_2$)Si(CH$_3$)$_2$—OH)$_2$ having a number average M$_n$ of from about 500 to 30,000 and

[(O—CH$_2$—CH$_2$O)$_n$]((CH$_2$)Si(CH$_3$)$_2$—OH)$_2$ having a number average M$_n$ of from about 500 to 30,000, being preferred and HO[Si(CH$_3$)$_2$O]$_n$H having a viscosity of from 10 to 2,000,000 mPas at 25° C. and HO[Si(CH$_3$)$_2$—O]$_n$[Si(CH$_3$)(CH=CH$_2$)—O]$_o$H having a viscosity of from 10 to 2,000,000 mPas at 25° C. being particularly preferred, where n and o are each an integer of at least 1 and are selected so that the indicated number averages and viscosities are obtained.

In the third step of the process, the urea compound of the formula (III), if no second step is carried out (process variant 1), or its reaction product with water if the second step is carried out (process variant 2), is reacted with a compound of the formula (IV). The first step reaction mixture or the second step reaction mixture may be mixed with a compound of the formula (IV) in any manner and allowed to react.

The third step is preferably carried out at a temperature of from 20 to 200° C., more preferably from 80 to 150° C., and preferably at a pressure of from 1 to 800 hPa, more preferably from 5 to 200 hPa. The reaction can be carried out with the aid of acidic or basic catalysts known to those skilled in the art, for example formic acid, phosphonitrilic chloride or ammonium hydroxide.

The siloxane copolymers prepared according to the invention can then be freed of any starting materials still present or any solvents or catalysts used by any convenient manner, e.g. by distillation or extraction.

The components used in the process of the invention are commercial products or can be prepared by methods customary in chemistry. The components used in the process of the invention can in each case be one type of such a component or a mixture of at least two types of a respective component.

The process of the invention can be carried out continuously or batchwise, with a continuous process being preferred. Process variant 1 according to the invention is characterized in that in a first step an organyloxysilane of the formula (I) is reacted with an isocyanate of the formula (II) to form a urea compound of the formula (III) and in a further step the urea compound of the formula (III) is reacted with a silanol-terminated compound of the formula (IV) in the presence or absence of a catalyst to form copolymers.

Process variant 2 according to the invention is characterized in that in a first step an organyloxysilane of the formula (I) is reacted with an isocyanate of the formula (II) to form a urea compound of the formula (III), in a second step the urea compound of the formula (III) is reacted with water and in a third step the reaction product of the urea compound of the formula (III) obtained from the second step is reacted in the presence or absence of a catalyst with a silanol-terminated compound of the formula (IV) to form copolymers.

In the further step of the process variant 1 according to the invention, the urea compound of the formula (III) obtained in the first step is reacted with a compound of the formula (IV), preferably at a temperature of from 20 to 200° C., more preferably from 80 to 150° C., and preferably at a pressure of from 1 to 800 hPa, more preferably from 5 to 200 hPa, preferably in an approximately stoichiometric ratio of the hydrolyzable groups in (III) to the silanol groups in (IV) to eliminate R$^7$OH, where R$^7$ is as defined above. Solvent optionally used in the first process step does not have to be removed beforehand.

The further step of the process variant 1 according to the invention can be carried out with the aid of acidic or basic catalysts known to those skilled in the art, e.g. formic acid or ammonium hydroxide, but this is not preferred.

The process variant 1 preferably gives copolymers of the type (SiR$^1$$_2$—R$^6$—NR$^2$— (C=O)—NH—R$^3$—NH—(C=O)—NR$^2$—R$^6$—SiR$^1$$_2$O—SiR$^4$$_2$—R$^5$—SiR$^4$$_2$—O)$_n$, most preferably (Si(CH$_3$)$_2$—(CH$_2$)$_3$—NH—(C=O)—NH—R$^3$—NH—(C=O)—NH—(CH$_2$)$_3$—(Si (CH$_3$)$_2$—

$O)_{30-50})_n$, where $R^1$ to $R^6$ have one of the abovementioned meanings and n is an integer of at least 1, preferably an integer of at least 20, particularly preferably an integer of at least 50.

The copolymers prepared according to the invention by process variant 1 preferably have a viscosity of from 50 to 5000 Pas at 150° C.

In the third step of process variant 2, the reaction product of the urea compound of the formula (III) obtained in the second step is reacted with a compound of the formula (IV), preferably at a temperature of from 20 to 200° C., more preferably from 80 to 150° C., and preferably at a pressure of from 1 to 800 hPa, more preferably from 5 to 200 hPa, with elimination of water. Solvent optionally used in the first process step or an excess of water from the hydrolysis of the second step does not have to be removed beforehand. The reaction can be carried out with the aid of acidic or basic catalysts known to those skilled in the art, e.g. formic acid, phosphonitrilic chloride or ammonium hydroxide. The stoichiometric ratio of the reactants can be chosen freely and is preferably about 1.

The process variant 2 preferably gives copolymers of the type $(SiR^1_2—R^6—NR^2—(C=O)—NH—R^3—NH—(C=O)—NR^2—R^6—SiR^1_2O)_m(SiR^4_2—R^5—SiR^4_2—O)_n$, most preferably $(Si(CH_3)_2—(CH_2)_3—NH—(C=O)—NH—R^3—NH—(C=O)—NH—(CH_2)_3—Si(CH_3)_2—O)_m$ $((Si(CH_3)_2—O)_{30-50})_n$, where the polymer blocks can be randomly distributed, $R^1$ to $R^6$ each have one of the abovementioned meanings and m and n are each, independently of one another, an integer of at least one, preferably an integer of at least 20, most preferably an integer of at least 50. The copolymers prepared by process variant 2 preferably have a viscosity of from 50 to 5000 Pas at 150° C.

The copolymers prepared according to the invention by process variant 2 preferably have a viscosity of from 50 to 5000 Pas at 150° C.

The copolymers prepared according to the invention can be used for all purposes for which siloxane-urea copolymers have been used hitherto. In particular, they are suitable as additives in plastics processing (e.g. extrusion, injection molding, fiber spinning), as functional additives in other plastics, as thermoplastic materials which can be processed by extrusion, coextrusion and injection molding to produce profiles, films and components, in solution or dispersion for coating surfaces of all types, e.g. plastics, metals, wood or textiles.

The process of the invention has the advantage that it is simple to carry out and allows many possible block copolymers to be produced with great variability.

Furthermore, the process of the invention has the advantage that it makes simple control of the copolymer properties, e.g. rheology, thermoplasticity and elasticity, possible.

In addition, the process variant 1 according to the invention has the advantage that copolymers can be prepared in a well-defined manner.

The process variant 2 according to the invention has the advantage that the free choice of the stoichiometry of the copolymer blocks makes it possible for the properties to be set optimally.

In the following examples, all parts and percentages are, unless indicated otherwise, by weight. Unless indicated otherwise, the following examples are carried out at the pressure of the surrounding atmosphere, i.e. at about 1000 hPa, and at room temperature, i.e. about 20° C., or at a temperature which is established on combining the reactants at room temperature without additional heating or cooling. All viscosities reported in the examples are based on a temperature of 25° C.

Tensile strength, elongation at break and stress at 100% elongation (modulus) were determined in accordance with DIN 53504 (May 1994 edition) on test specimens having the shape S2.

Example 1

40.2 parts by weight of silane of the formula $(C_6H_{11})NH—CH_2—Si(CH_3)_2—OCH_3$ are reacted with 26.2 parts by weight of dicyclohexylmethane 4,4'-diisocyanate at 0° C. in 20 parts by weight of tetrahydrofuran (THF). After 30 minutes, isocyanate is no longer detectable by IR spectroscopy. The THF is removed under reduced pressure and a colorless solid is obtained. 22.1 parts by weight of the solid obtained in this way are kneaded with 200 parts by weight of a silanol-terminated polydimethylsiloxane having a mean molar mass (number average) of 3000 in an IKA laboratory kneader at 200 mbar and 150° C. for one hour and during this time freed of the methanol formed. A colorless, thermoplastic mass is obtained. This is pressed at 170° C. in a press to form a 2 mm thick plate and the mechanical properties of this are determined. Tensile strength: 2.2 MPa, elongation at break: 150%, stress at 100% elongation: 2.5 MPa.

Example 2

40.2 parts by weight of silane of the formula $(C_6H_{11})NH—CH_2—Si(CH_3)_2—OCH_3$ are reacted with 26.2 parts by weight of dicyclohexylmethane 4,4'-diisocyanate at 0° C. in 20 parts by weight of tetrahydrofuran (THF). After 30 minutes, isocyanate is no longer detectable by IR spectroscopy. The THF is removed under reduced pressure and a colorless solid is obtained. 22.1 parts by weight of the solid obtained in this way are kneaded with 200 parts by weight of a silanol-terminated polydimethylsiloxane having a mean molar mass (number average) of 3000 and 1.2 parts by weight of aqueous formic acid (0.01 part by weight of 98% strength formic acid) in an IKA laboratory kneader at 200 mbar and 150° C. for one hour and during this time freed of the methanol formed. A colorless, thermoplastic mass is obtained. This is pressed at 170° C. in a press to form a 2 mm thick plate and the mechanical properties of this are determined. Tensile strength: 2.8 MPa, elongation at break: 210%, stress at 100% elongation: 3.2 MPa.

Example 3

4020 g/h of the silane of the formula $(C_6H_{11})NH—CH_2—Si(CH_3)_2—OCH_3$ are metered into the first sector (length L/D=4) of a corotating W&P twin-screw extruder (25 mm screw diameter, L/D=40) at 80° C. 2620 g/h of dicyclohexylmethane 4,4'-diisocyanate are metered into the second sector at 140° C. 6000 g/h of a silanol-terminated polydimethylsiloxane having a mean molar mass (number average) of 3000 are metered into the third sector (160° C.). The remaining sectors are maintained at 180° C., and the second-last sector is evacuated at 100 mbar. A colorless, thermoplastic strand of extrudate is obtained and is cooled in a water bath and then pelletized. The pellets are pressed at 170° C. in a press to form a 2 mm thick plate and the mechanical properties of this are determined. Tensile strength: 3.6 MPa, elongation at break: 260%, stress at 100% elongation: 3.4 MPa.

Example 4

40.2 parts by weight of silane of the formula $(C_6H_{11})NH—CH_2—Si(CH_3)_2—OCH_3$ are reacted with 26.2 parts by weight of dicyclohexylmethane 4,4'-diisocyanate at 0° C. in 20 parts by weight of tetrahydrofuran (THF). After 30 minutes, isocyanate is no longer detectable by IR spectroscopy. The THF is removed under reduced pressure and a colorless solid is obtained. 22.1 parts by weight of the solid obtained in this way are kneaded with 1.2 parts by weight of aqueous formic acid (0.01 part by weight of 98% strength formic acid) in an IKA laboratory kneader at 1013 mbar and 80° C. for 30 minutes. The reaction mixture obtained in this way is kneaded with 200 parts by weight of a silanol-terminated polydimethylsiloxane having a mean molar mass (number average) of 3000 at 200 mbar and 150° C. for one hour and during this time freed of the methanol formed. A colorless, thermoplastic mass is obtained. This is pressed at 170° C. in a press to form a 2 mm thick plate and the mechanical properties of this are determined. Tensile strength: 2.7 MPa, elongation at break: 220%, stress at 100% elongation: 3.2 MPa.

The invention claimed is:

1. A process for preparing siloxane copolymers, comprising:

in a first step, reacting an organyloxysilane of the formula $$R^7O\text{—}SiR^1_2\text{—}R^6\text{—}NHR^2 \quad (I)$$

with an isocyanate of the formula $$R^3(NCO)_x \quad (II)$$

to form a urea compound of the formula $$R^3(NH\text{—}(C\text{=}O)\text{—}NR^2\text{—}R^6\text{—}SiR^1_2\text{—}OR^7)_x \quad (III)$$

where the radicals $R^1$ are individually a monovalent, substituted or unsubstituted hydrocarbon radical optionally interrupted by heteroatom(s), $R^2$ individually is hydrogen or a monovalent, substituted or unsubstituted hydrocarbon radical optionally interrupted by heteroatoms, $R^3$ individually is a polyvalent, substituted or unsubstituted hydrocarbon radical optionally interrupted by heteroatoms, $R^6$ individually is a divalent hydrocarbon radical optionally interrupted by heteroatoms, $R^7$ individually is a monovalent, substituted or unsubstituted hydrocarbon radical optionally interrupted by heteroatoms, and x is an integer greater than 1;

optionally, in a second step, hydrolyzing the urea compound of the formula (III) with water; and in a third step, reacting the urea compound of the formula (III) and/or its reaction product obtained from the second step, with a silanol-terminated compound of the formula $$R^5(SiR^4_2\text{—}OH)_y \quad (IV)$$

to form a copolymer, where the radicals $R^4$ individually have one of the meanings given for $R^1$, $R^5$ individually are polyvalent polyether radicals, polyester radicals, or polysiloxane radicals, and y is an integer greater than 1.

2. The process of claim 1, wherein the isocyanate of the formula (II) is used in amounts of from 0.9 to 1.1 molar equivalents of isocyanate groups to amine groups of the silane of the formula (I).

3. The process of claim 1, wherein the reaction in the first step is carried out at a temperature of from 0 to 80° C. and at the pressure of the surrounding atmosphere.

4. The process of claim 1, wherein the optional second step is practiced, and the urea compound of the formula (III) obtained in the first step is reacted with water in a stoichiometric ratio to the amount of hydrolyzable groups or in excess to liberate compound $R^7OH$.

5. The process of claim 1, wherein the second step is practiced, and hydrolyzing in the second step is carried out at a temperature of from 0 to 80° C. and at the pressure of the surrounding atmosphere.

6. The process of claim 1, wherein the reaction in the third step is carried out at a temperature of from 20 to 200° C. and at a pressure of from 1 to 800 hPa.

7. The process of claim 1, wherein in a first step, an organyloxysilane of the formula (I) is reacted with an isocyanate of the formula (II) to form a urea compound of the formula (III) and in a further step, the urea compound of the formula (III) is reacted with a silanol-terminated compound of the formula (IV) in the presence or absence of a catalyst to form copolymer(s), without first hydrolyzing the urea compound of the formula (III) with water.

8. The process of claim 1, wherein in a first step, an organyloxysilane of the formula (I) is reacted with an isocyanate of the formula (II) to form a urea compound of the formula (III), in a second step, the urea compound of the formula (III) is reacted with water and in a third step, the reaction product of the urea compound of the formula (III) obtained from the second step is reacted, optionally in the presence of a catalyst, with a silanol-terminated compound of the formula (IV), to form copolymer(s).

9. The process of claim 1, wherein $R^3$ is a divalent or trivalent hydrocarbon radical, optionally interrupted by one or more heteroatoms, and x is 2 when $R^3$ is divalent and x is 3 when $R^3$ is trivalent.

10. The process of claim 1, wherein $R^3$ is a divalent or trivalent $C_{1-24}$ hydrocarbon radical, and x is 2 when $R^3$ is divalent and x is 3 when $R^3$ is trivalent.

11. The process of claim 1, wherein $R^3$ of the isocyanate $R^3(NCO)_x$ is selected from the group consisting of 4,4'-methylenedicyclohexylene, 4,4'-methylenediphenylene, 1,3-diazetidiene-2,4-dionebis(4,4-methylenedicyclohexyl)ene, isocyanuratetris(4,4'-methylenedicylcohexyl)ene, 1,3-diazetidine-2,4-dionebis(4,4'-methylene-diphenyl)ene, isocyanuratetris(4,4'-methylenediphenyl)ene, isophoronylene, methylene, ethylene, n-propylene, isopropylene, n-butylene, isobutylene, tert-butylene, n-pentylene, isopentylene, neopentylene, tert-pentylene, hexylene, heptylene, octylene, nonylene, decylene, dodecylene, vinylene, allylene, cyclopentylene, cyclohexylene, cycloheptylene, methylcyclohexylene phenylene, naphthylene, o-, m-, and p-tolylene, xylylene, ethylphenylene, benzylene, α-phenylethylene, β-phenylethylene, and mixtures thereof.

* * * * *

UNITED STATES PATENT AND TRADEMARK OFFICE
CERTIFICATE OF CORRECTION

PATENT NO. : 7,795,367 B2
APPLICATION NO. : 11/568132
DATED : September 14, 2010
INVENTOR(S) : Wolfgang Ziche It is certified that error appears in the above-identified patent and that said Letters Patent is hereby corrected as shown below:

Column 9, Line 55, Claim 1:

Delete the formula:

$R^5(SiR^4_2\text{-}OH)_{hd\ y}$ and insert the formula:

$R^5(SiR^4_2\text{-}OH)_y$

Signed and Sealed this

Seventh Day of December, 2010

David J. Kappos
*Director of the United States Patent and Trademark Office*